US011184382B2

(12) United States Patent
Stopel et al.

(10) Patent No.: US 11,184,382 B2
(45) Date of Patent: Nov. 23, 2021

(54) TECHNIQUES FOR PROTECTING APPLICATIONS FROM UNSECURE NETWORK EXPOSURE

(71) Applicant: Twistlock, Ltd., Herzliya (IL)

(72) Inventors: Dima Stopel, Herzliya (IL); Liron Levin, Herzliya (IL); Daniel Shapira, Rishon Lezion (IL); Nitsan Ben Nun, Limassol (CY); John Morello, Baton Rouge, LA (US)

(73) Assignee: Twistlock, LTD., Herzliya (IL)

(*) Notice: Subject to any disclaimer, the term of this patent is extended or adjusted under 35 U.S.C. 154(b) by 279 days.

(21) Appl. No.: 16/162,897

(22) Filed: Oct. 17, 2018

(65) Prior Publication Data
US 2019/0116199 A1 Apr. 18, 2019

Related U.S. Application Data

(60) Provisional application No. 62/573,309, filed on Oct. 17, 2017.

(51) Int. Cl.
*H04L 29/06* (2006.01)
*G06F 9/54* (2006.01)
(Continued)

(52) U.S. Cl.
CPC .......... *H04L 63/1433* (2013.01); *G06F 9/545* (2013.01); *H04L 41/065* (2013.01);
(Continued)

(58) Field of Classification Search
CPC ............ H04L 63/1433; H04L 63/1441; H04L 63/308; H04L 41/065; H04L 41/0866; H04L 43/12; H04L 43/50; G06F 9/545
(Continued)

(56) References Cited

U.S. PATENT DOCUMENTS

2012/0011567 A1* 1/2012 Cronk ................ H04N 21/4753
726/4
2016/0057166 A1* 2/2016 Chesla .................... H04L 63/14
726/23

(Continued)

OTHER PUBLICATIONS

Nobakht et al., "A Host-based Intrusion Detection and Mitigation Framework for Smart Home IoT using OpenFlow" Sep. 16, 2016, IEEE pp. 147-156. (Year: 2016).*

(Continued)

*Primary Examiner* — Khalil Naghdali
(74) *Attorney, Agent, or Firm* — M&B IP Analysts, LLC

(57) ABSTRACT

A method and system for protecting an application from unsecure network exposure. The method includes identifying at least one port through which the application is accessible when the application is not configured correctly, wherein the application is executed at a host device connected to at least one network, the host device having the at least one port; sending, to an external resource, connection data for connecting to the application via the at least one port, wherein the external resource is configured to attempt to connect to the application based on the connection data and to return results of the connection attempt; determining, based on the results of the connection attempt, whether an exposure vulnerability exists; and performing at least one mitigation action when an exposure vulnerability exists.

18 Claims, 5 Drawing Sheets

(51) Int. Cl.
*H04L 12/24* (2006.01)
*H04L 12/26* (2006.01)

(52) U.S. Cl.
CPC .......... *H04L 41/0866* (2013.01); *H04L 43/12* (2013.01); *H04L 63/1441* (2013.01); *H04L 63/308* (2013.01); *H04L 43/50* (2013.01)

(58) Field of Classification Search
USPC .......................................................... 726/25
See application file for complete search history.

(56) References Cited

U.S. PATENT DOCUMENTS

| | | | |
|---|---|---|---|
| 2017/0142068 A1* | 5/2017 | Devarajan | H04L 67/146 |
| 2017/0251013 A1* | 8/2017 | Kirti | H04L 63/1441 |
| 2019/0081983 A1* | 3/2019 | Teal | H04L 63/14 |
| 2019/0207955 A1* | 7/2019 | El-Moussa | H04L 63/1441 |
| 2020/0228561 A1* | 7/2020 | Petry | H04L 67/2814 |

OTHER PUBLICATIONS

Rina Lopez, "Pentesting on Web Applications using Ethical Hacking", 2016 IEEE 36th Central American and Panama Convention, pp. 1-6 (Year: 2016).*

* cited by examiner

TECHNIQUES FOR PROTECTING APPLICATIONS FROM UNSECURE NETWORK EXPOSURE

CROSS-REFERENCE TO RELATED APPLICATIONS

This application claims the benefit of U.S. Provisional Application No. 62/573,309 filed on Oct. 17, 2017, the contents of which are hereby incorporated by reference.

TECHNICAL FIELD

The present disclosure generally relates to cybersecurity systems, and more particularly to protecting applications from unsecure exposure to external networks.

BACKGROUND

A host device (also known as a "host") is a device connected to a computer network that may offer information resources, services, and/or applications to users or other nodes on the network. The host device is configured with one or more endpoints of communication, also known as ports, which allow for establishing a connection to the network. Establishing a connection to the network subjects the host device to potential vulnerabilities caused by external malicious entities. In particular, applications executed on a host device may be vulnerable to manipulation or other interference by malicious entities such as hackers. This interference may cause issues such as data leakage, spreading of malware, disrupting service, and the like. This vulnerability may be particularly acute for applications that are configured incorrectly, for example applications that have not received required updates or were not configured correctly initially.

A software container is an instance of a user-space running an application within the operating system (OS) of a host (e.g., a server). Software containers enable operating-system-level virtualization in which the OS kernel allows the existence of multiple isolated software containers. To provide network connectivity for the application, a software container may allow access by the application to one or more of the host's ports. This access can render the application vulnerable to threats over a network.

A software container (or a container) provides an executable environment with a complete filesystem. The filesystem may contain code, runtime, system tools, system libraries, and so on. That is, execution of a software container can be the same regardless of the underlying infrastructure. Docker is one of the popular existing platforms for creating, migrating, managing, and deploying software containers.

A software container, unlike a virtual machine, does not require or include a separate operating system. Rather, the container relies on the kernel's functionality and uses hardware resources (CPU, memory, I/O, network, etc.) and separate namespaces to isolate the application's view of the operating system. A software container can access the OS kernel's virtualization features either directly or indirectly. For example, Linux kernel can be accessed directly using the libcontainer library or indirectly using the libvirt service.

As demonstrated in FIG. 1, a number of software containers (i.e., the app containers 110-1 through 110-$n$, hereinafter referred to individually as a container 110, merely for simplicity purposes) can access and share the same OS kernel 120. However, each container 110 can be constrained to only use a defined amount of hardware resources (e.g., CPU, memory, etc.) in the underlying hardware layer 130. Thus, using software containers, hardware resources can be isolated, services can be restricted, and processes can be provisioned to have an almost completely private view of the operating system with their own process ID space, file system structure, and network interfaces.

FIG. 2 illustrates a typical structure of a software container 200. The software container 200 includes a base image 210 and a container layer 220. The base image 210 includes one or more image layers 215-1 through 215-$q$ (hereinafter referred to individually as a layer 215 and collectively as layers 215, merely for simplicity purposes). The layers 215 are read-only layers that represent filesystem differences. That is, the layers 215 are stacked on top of each other to form a base for the container's 200 root filesystem. The layers 215 are read only, and each layer 215 is identified by a randomly generated identifier number of a checksum computed using a hash function.

The base image 210 (and its layers 215) can be shared across different software containers. Thus, only the container layer 220 differentiates between one software container and another. The container layer 220 is a readable and writable layer where all data written to the software container 200 are saved in the container layer 220. When the software container 200 is deleted, the writable container layer 220 is also deleted, and the base image 210 remains unchanged. As such, the multiple software containers 200 can share access to the same base image 210, each of which has its own data state. In the example demonstrated in FIG. 2, the software container 200 is a Docker container (e.g., compliant with the Docker platform).

The popularity of software containers has been increased due to the easy integration with cloud-computing platforms (e.g., Amazon® Web Services, Google® Cloud Platform, Microsoft® Azure, etc.). On such platforms, service providers can offer operating systems to run services and applications. With that said, the increasing reliance on software containers increases the need for secured execution.

When a software application (application) is deployed into a container, its intended behavior is more declarative than in a traditional (non-container) model. For example, the container runtime exposes certain information about a system, such as the storage volumes mounted to the system, the networks that are linked to the system, and the processes which are instructed to execute within the system. However, application specific information, namely information about how a particular application is configured to operate, is not accessible through these common interfaces. These configuration attributes are described and set within the application's configuration file, which may be located inside of a container, and are thus not exposed through the container layer's interfaces. This limits the ability of security tools to adjust certain settings and implement security rules that could provide appropriate protection for the unique needs of the application.

As an example, a web server container may be configured to map a first port on the host to a second port on the container. When ports are exposed in this manner, security software can monitor a list of exposed ports in order to ensure that such a list is consistent with what is specified within an application when it is launched. However, other application specific runtime data, such as ports that are listening but not mapped, file paths that the web server writes to and reads from, and system calls required by the application, are not accessible to security tools because the container layer does not provide a consistent interface from which to describe and retrieve them.

Images, such as those for a web server, are often composed of common software that is in widespread use, for which configuration parsing knowledge can be developed centrally and applied to multiple customer installations. Containers always explicitly declare the ports that are exposed on the host network and these declarations can be discovered via container engine APIs. Thus, many such images are susceptible to attacks.

It would therefore be therefore advantageous to provide a solution that would secure the execution of software containers.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for protecting an application from unsecure network exposure. The method comprises: identifying at least one port through which the application is accessible when the application is not configured correctly, wherein the application is executed at a host device connected to at least one network, the host device having the at least one port; sending, to an external resource, connection data for connecting to the application via the at least one port, wherein the external resource is configured to attempt to connect to the application based on the connection data and to return results of the connection attempt; determining, based on the results of the connection attempt, whether an exposure vulnerability exists; and performing at least one mitigation action when an exposure vulnerability exists.

Certain embodiments disclosed herein also include a non-transitory computer readable medium having stored thereon causing a processing circuitry to execute a process for protecting an application from unsecure network exposure, the process comprising: identifying at least one port through which the application is accessible when the application is not configured correctly, wherein the application is executed at a host device connected to at least one network, the host device having the at least one port; sending, to an external resource, connection data for connecting to the application via the at least one port, wherein the external resource is configured to attempt to connect to the application based on the connection data and to return results of the connection attempt; determining, based on the results of the connection attempt, whether an exposure vulnerability exists; and performing at least one mitigation action when an exposure vulnerability exists.

Certain embodiments disclosed herein also include a system for protecting an application from unsecure network exposure. The system comprises: a processing circuitry; and a memory, the memory containing instructions that, when executed by the processing circuitry, configure the system to: identify at least one port through which the application is accessible when the application is not configured correctly, wherein the application is executed at a host device connected to at least one network, the host device having the at least one port; send, to an external resource, connection data for connecting to the application via the at least one port, wherein the external resource is configured to attempt to connect to the application based on the connection data and to return results of the connection attempt; determine, based on the results of the connection attempt, whether an exposure vulnerability exists; and perform at least one mitigation action when an exposure vulnerability exists.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
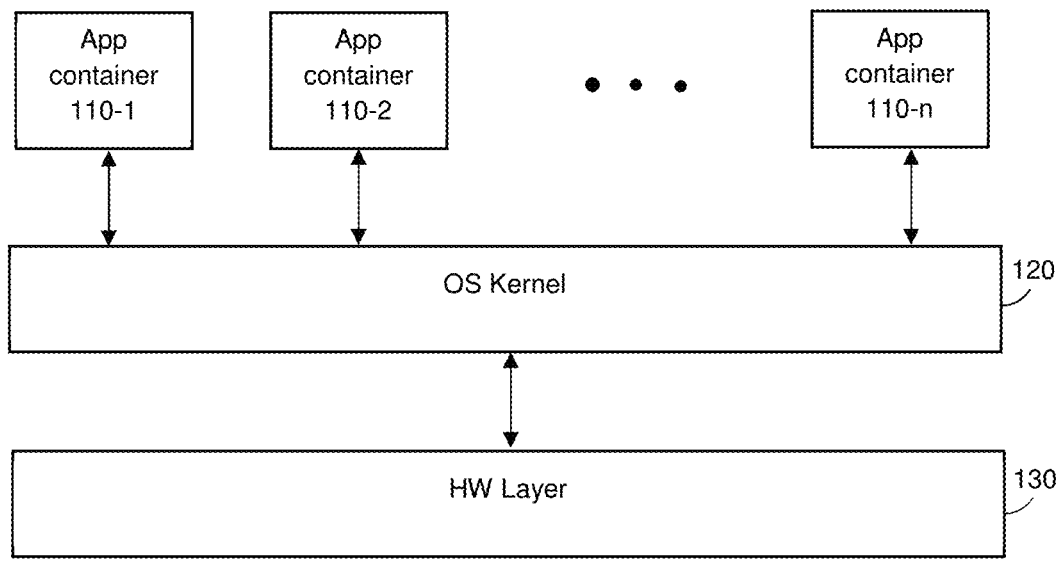
FIG. 1 is a diagram illustrating execution of a plurality of software containers.
Figure 2:
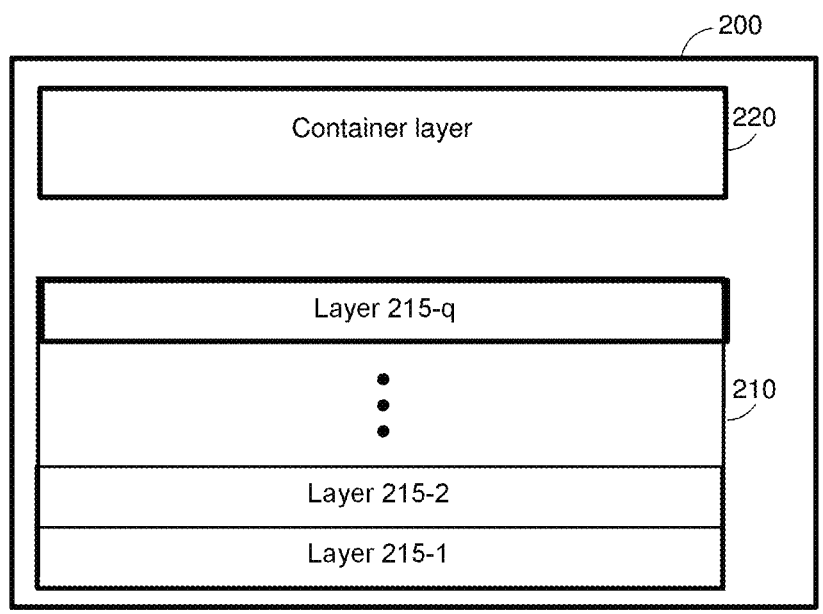
FIG. 2 is a diagram illustrating a structure of a software container.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

To interact with external resources, host devices may be configured with ports for allowing access to these external resources. Errors in configuration of these ports or other configurations of the applications executed on the host devices may result in exposure to unsecure or otherwise potentially dangerous external resources without authentication or authorization. For example, an application may be unintentionally exposed to the Internet, thereby causing the application to be at risk of being manipulated by malicious entities. As a result of these exposure issues, it would be desirable for a solution to identify unsecure exposure of applications to external resources and, in particular, exposure that is not authenticated, authorized, or both. Some embodiments further protect applications executed via software containers by protecting software containers that may be exposed external resources.

The disclosed embodiments include a method and system for protecting a containerized application from unsecure network exposure. According to the disclosed embodiments, a containerized application that is vulnerable to exposure by external resources is detected. An application that may be at risk of unsecure exposure is identified. It is checked whether the application is configured correctly. When the application is not configured correctly, one or more accessible ports that may improperly expose the application to external resources are identified. An attempt to connect to each of the identified ports is made by a test external resource. If the attempt is successful (i.e., the identified port is accessible to the test external resource), a network exposure vulnerability is detected. An alert indicating the detected vulnerability may be sent.

The embodiments disclosed herein may therefore include a static test performed offline and a dynamic test performed online during runtime of the application being tested. In an embodiment, the static test is performed to identify an at-risk application, and the dynamic test is performed to determine whether there is an exposure vulnerability when the application is at risk.

Figure 3:
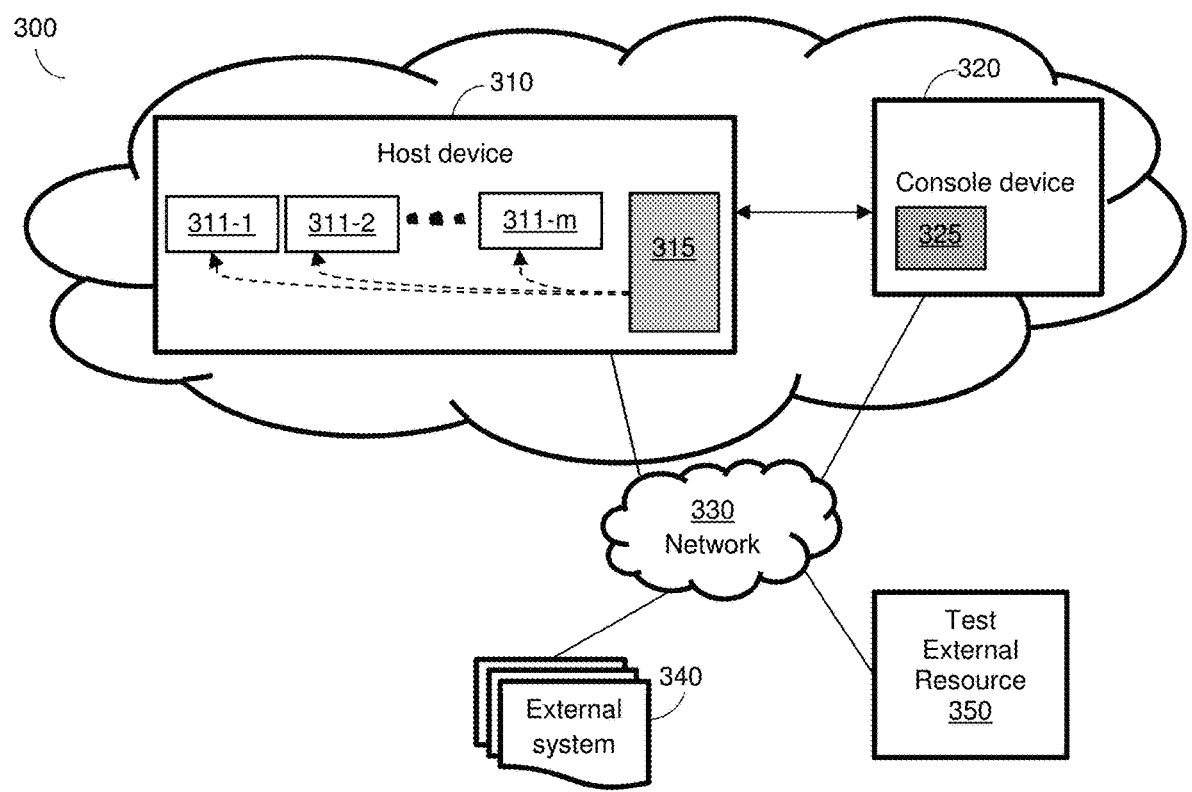
FIG. 3 is a network diagram utilized to describe various disclosed embodiments.

FIG. 3 is an example network diagram 300 utilized to describe various disclosed embodiments. A host device 310 is communicatively connected to a console device 320. Each of the devices 310 and 320 can be realized as a physical machine, a virtual machine, or a cloud-computing infrastructure (IaaS). Examples for such an infrastructure include, but are not limited to, Amazon Web Services (AWS), Cisco® Metapod, Microsoft Azure®, Google® Compute Engine (GCE), Joyent®, and the like.

The devices 310 and 320 may be deployed in a datacenter, a cloud computing platform (e.g., a public cloud, a private cloud, or a hybrid cloud), on-premises of an organization, or in a combination thereof. It should be noted that the devices 310 and 320 can be deployed in different geographical locations.

The host device 310 is configured to host and execute a plurality of software containers 311-1 through 311-*m*, where 'm' is an integer equal to or greater than 1 (collectively referred to hereinafter as APP containers 311 or individually as an APP container 311, merely for simplicity purposes). Each APP container 311 is a software container configured to execute a specific application (APP).

According to the disclosed embodiments, the host device 310 is configured to host and execute a detector container 315. The detector container 315 is a software container designed to detect vulnerabilities in any APP container 311. In particular, vulnerabilities detected according to various disclosed embodiments include unauthorized or unapproved exposure of one or more ports (not shown) to external resources.

In an optional deployment, the console device 320 also interfaces with one or more external systems 340 through the network 330. Examples for such systems 340 may include, but are not limited to, an active directory of an origination to retrieve user permissions, access control systems (e.g., Docker Swarm, and Kubernetes management plane), SIEM systems to report on detected vulnerabilities, audit and compliance systems, and the like.

The test external resource 350 is configured to attempt to connect to apps executed by the APP containers 311 to allow for identifying potential exposure vulnerabilities. To this end, the test external resource 350 may be, but is not limited to, a server of an exposure vulnerability testing service. The test external resource 350 is configured to send results of connection attempts to the detector container 315.

In an embodiment, the console device 320 is configured to host and execute at least one console container 325. The console container 325 is a software container that interfaces with the detector container 315. Specifically, the console container 325 is designed to provide any relevant container data (e.g., container specifications) to the detector container 315.

The network 330 may be the Internet, the world-wide-web (WWW), a local area network (LAN), a wide area network (WAN), a metro area network (MAN), and other networks. It should be noted that the connection between the host device 310 and the console device 320 can be facilitated over a network, such as the network 330.

In an embodiment, the detector container 315 is configured to identify an APP container 311 that is at risk of unsecure (e.g., unauthorized or unapproved) exposure. The at-risk application may be, but is not limited to, an application that is configured to handle sensitive information (e.g., financial data, production data, and the like), an application that is configured for external resource access (e.g., an application configured with ports for connecting to a network), an application with weak transport layer security (TLS), and the like. For the sake of simplicity of discussion and without limiting the disclosed embodiments, as an example, the APP container 311-1 may be identified as at risk.

In an embodiment, the detector container 315 is configured to perform static testing to determine whether the application executed by the identified APP container 311-1 is configured correctly. Determining whether the application is configured correctly may include, but is not limited to, analyzing a container specification of the APP container 311-1, attempting to access the application, and the like. To this end, in some implementations, the detector container 315 may be configured to attempt to access the APP containers 311 via one or more ports. In another example implementation, analyzing the container specification may include a password indicated in the container specification to a list of unsecure passwords.

In an embodiment, when the application is not configured correctly, the detector container 315 is configured to perform dynamic testing at runtime of the at-risk application in order to detect any exposure vulnerabilities of the application. To this end, the detector container 315 is configured to determine through which ports of the APP container 311-1 the application is accessible. The detector container 315 is configured to send, to the test external resource 350, connection data for connecting to the determined access ports. As a non-limiting example, the connection data may include a port identifier of each determined port. As another non-limiting example, the connection data may include an Internet Protocol (IP) address. The test external resource 350 is configured to attempt to connect to each determined port based on the connection data and to send a results notification indicating results of the attempt to the detector container 315. In some implementations, the results notification may further include an external IP address of the host device. To this end, the test external resource may be configured to identify the public IP address of the application executed on the APP container 311-1, for example, based on a src-dest ip tuple.

In an embodiment, when the results notification indicates that the connection attempt was successful (i.e., that the test external resource 350 successful connected to the determined port), an exposure vulnerability is detected and the detector container 315 is configured to generate and send an alert to the console device 320. The alert may include, but is not limited to, a container identifier, a port identifier, and the like.

In an embodiment, when the connection attempt by the test external resource 350 is successful, IP addresses of external resources that access the APP container 311-1 may be collected. The alert may further include the collected IP addresses. As mentioned above, the console device 320 may cause the display of the alert to a security information and event management (SIEM) device via the console container 325.

The embodiments disclosed herein are not limited to the specific architecture illustrated in FIG. 3, and other architectures may be used without departing from the scope of the disclosed embodiments. Specifically, the console container 325 may reside in the host device 310. Further, in an embodiment, there may be a plurality of detector containers 315 operating as described hereinabove and configured to either have one as a standby, to share loads between them, or to split the functions between them. In addition, other software containers or processes that handle the management and configuration of the APP containers 311, the detector container 315, the console container 325, or a combination thereof, may be hosted in the devices 310 and 320. Examples for such software containers or processes may include a Docker engine, a networking container, drivers, and so on.

It should be noted that the embodiments described with respect to FIG. 3 are discussed with respect to a host device 310 executing software containers 311 and using a detector container 315. At least some of the disclosed embodiments may be utilized to protect host devices that do not execute software containers. An example network diagram used to describe various disclosed embodiments in which the host device does not execute a software container is described below with respect to FIG. 6.

Figure 4:
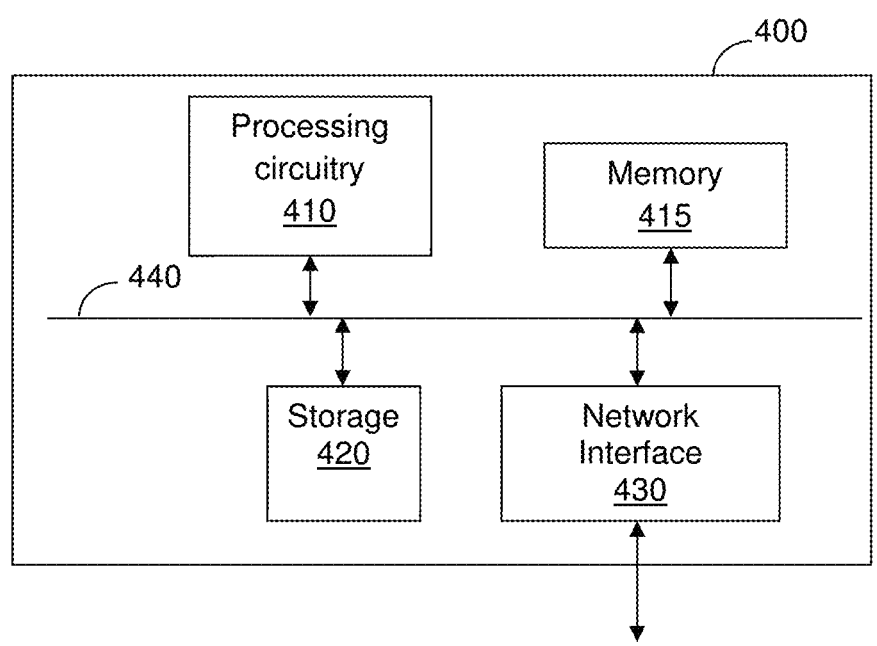
FIG. 4 is a block diagram of a hardware layer in host devices utilized to execute at least a detector container and a console container according to an embodiment.

It should be appreciated that each device 310 and 320 requires an underlying hardware layer to execute the OS, VMs, and software containers. An example block diagram of a hardware layer 400 is shown in FIG. 4. The hardware layer 400 includes a processing circuitry 410, a memory 415, a storage 420, and a network interface 430, all connected to a computer bus 440.

The processing circuitry 410 may be realized by one or more hardware logic components and circuits. For example, and without limitation, illustrative types of hardware logic components that can be used include Field Programmable Gate Arrays (FPGAs), Application-specific Integrated Circuits (ASICs), System-on-a-chip systems (SOCs), Complex Programmable Logic Devices (CPLDs), general-purpose microprocessors, microcontrollers, digital signal processors (DSPs), and the like, or any other hardware logic components that can perform calculations or other manipulations of information. The memory may be volatile, non-volatile, or a combination thereof. The storage may be magnetic storage, optical storage, and the like.

In one configuration, computer readable instructions to implement one or more embodiments disclosed herein may be stored in the storage. The storage may also store other computer readable instructions to implement an operating system, an application program, and the like. Computer readable instructions may be loaded in the memory for execution by the processing system 410.

In another embodiment, the storage 420, the memory 415, or both, are configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 410 to perform the various embodiments described herein.

The network interface 430 allows communication with other external systems or host devices through a network (e.g., the network 330). The network interface 430 may include a wired connection or a wireless connection. The network interface 430 may transmit communication media, receive communication media, or both. The computer bus 440 may be, for example, a PCIe bus.

Figure 5:
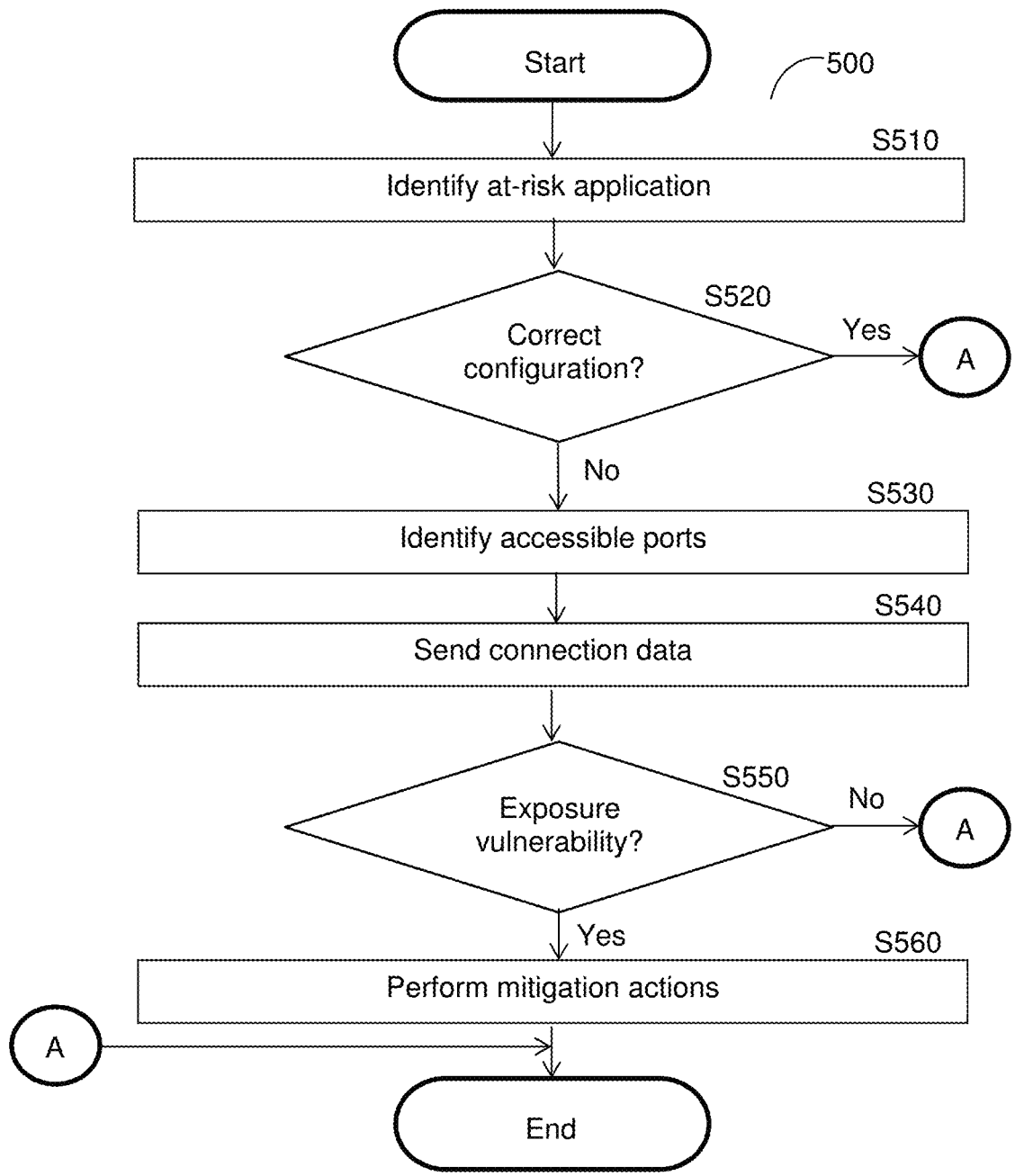
FIG. 5 is a flowchart illustrating a method for protecting a containerized application from unsecure network exposure according to an embodiment.

FIG. 5 shows an example flowchart 500 illustrating a method for protecting an application from unsecure network exposure according to an embodiment. In an embodiment, the method may be performed by the detector container 315 to protect an application executed by one of the APP containers 311, FIG. 3. In another embodiment, the method may be performed by the detector 615 to protect an application executed by the host device 610, FIG. 6.

At S510, an application at risk of an exposure vulnerability is identified. During execution, the application is executed at a host device that is configured with one or more ports for allowing access of the application to external resources. Identifying the at-risk application includes identifying an application that is exposed to a network during execution and, further, an application that may be a target of malicious entities over the network. To this end, in an embodiment, the identified application may be, but is not limited to, an application configured to handle sensitive information, an application configured to connect to external resources (e.g., an application configured with one or more ports for connecting to a network), a common application installed on the host, and the like.

The host device may include software containers and provide a containerized environment for executing the identified application. To this end, when the host device includes software containers, S510 may further include identifying a software container that is at risk of an exposure vulnerability. The identified software container may be the software container used for executing the application.

At S520, it is checked whether the application to be executed at the identified host device is configured correctly and, if so, execution continues terminates; otherwise, execution continues with S530. In an embodiment, S520 includes performing one or more static configuration tests. The static configuration tests may include, but are not limited to, attempting to access the application by an internal resource (i.e., a resource of the same host device), analyzing a specification of an identified software container (when the host device includes software containers), detecting how the application is configured on disk, and the like.

At S530, when the application is not configured correctly, one or more ports through which the application is accessible are identified. In an embodiment, S530 may include probing ports of the identified host device.

At S540, connection data for connecting to the application through each identified port is sent to a test external resource. The test external resource is configured to attempt to connect to the application based on the connection data, and to return results of the connection attempt. In an example implementation, the test external resource may further attempt to access the application in an insecure manner. For example, the test external resource may attempt to access the application using one or more common passwords.

At S550, based on the results of the connection attempt, it is determined whether an exposure vulnerability exists for the application and, if so, execution continues with S560; otherwise, execution terminates. An exposure vulnerability may exist when, for example, a connection by the test external resource to one or more exposed ports is successful.

At S560, when is determined that an exposure vulnerability exists, one or more mitigation actions may be performed. Such mitigation actions may include, but are not limited to, generating and sending an alert, blocking connections, reconfiguring the host device, reconfiguring the application, and the like. The alert may indicate, for example, an identifier of the exposed host device, an identifier of a software container containing the at-risk application, an identifier of each exposed port, and the like. In an embodiment, S560 may further include collecting IP addresses of resources that access the at-risk application. The alert may further indicate the collected IP addresses. In some implementations, the results of the connection attempt may further include a public IP address of the exposed container, and the alert may include the public IP address. In another implementation, S560 may include extracting the global IP address of the exposed host device from an orchestration manager of the host device.

Figure 6:
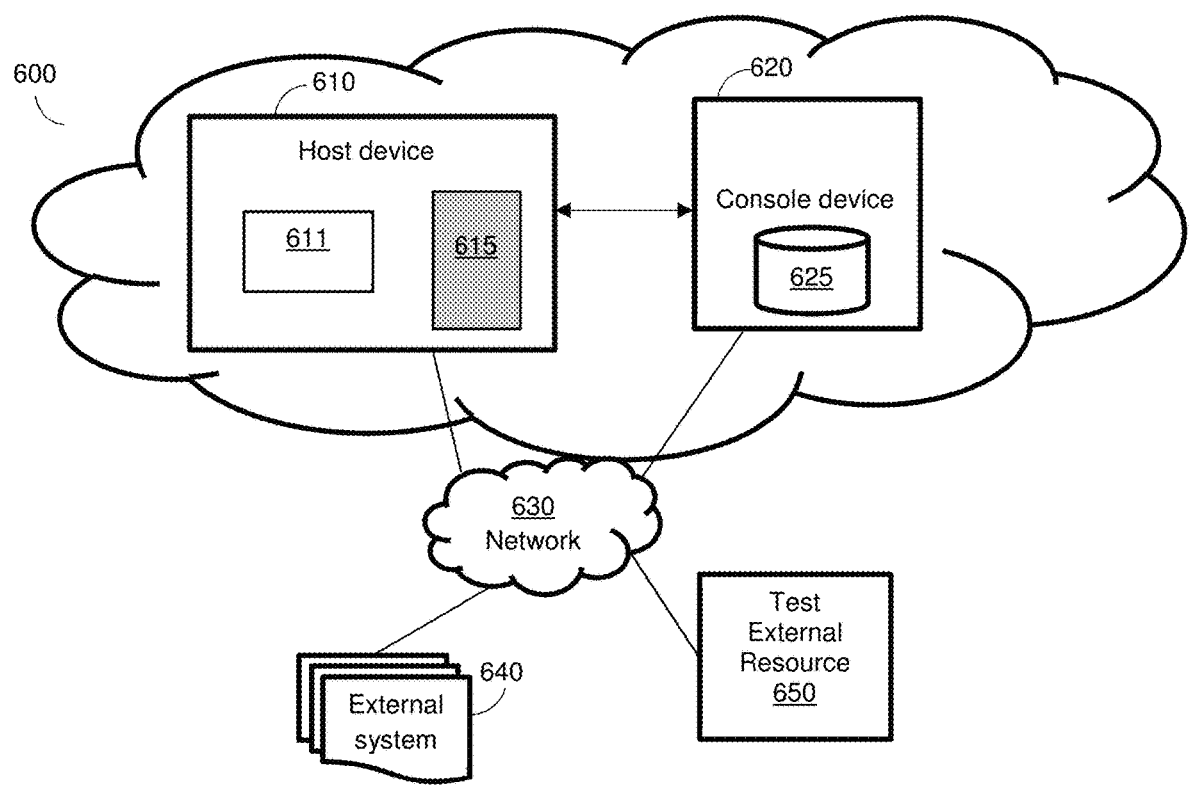
FIG. 6 is a network diagram utilized to describe various disclosed embodiments.

FIG. 6 is an example network diagram 600 utilized to describe various disclosed embodiments. In the example network diagram 600, a host device 610 and a console device 620 may interface with one or more external systems 640 over a network 630. The network 630 may be the Internet, the world-wide-web (WWW), a local area network (LAN), a wide area network (WAN), a metro area network (MAN), and other networks.

Examples for the external systems 640 may include, but are not limited to, an active directory of an origination to retrieve user permissions, access control systems (e.g., Docker Swarm, and Kubernetes management plane), SIEM systems to report on detected vulnerabilities, audit and compliance systems, and the like.

The host device 610 communicates with a console device 620. Each of the devices 610 and 620 can be realized as a physical machine, a virtual machine, or a cloud-computing infrastructure (IaaS). Examples for such an infrastructure include, but are not limited to, Amazon Web Services (AWS), Cisco® Metapod, Microsoft Azure®, Google® Compute Engine (GCE), Joyent®, and the like. An example hardware layer for the host device 610 is discussed above with respect to FIG. 4.

The devices 610 and 620 may be deployed in a datacenter, a cloud computing platform (e.g., a public cloud, a private cloud, or a hybrid cloud), on-premises of an organization, or in a combination thereof. It should be noted that the devices 610 and 620 can be deployed in different geographical locations.

In an embodiment, the host device 610 is configured to host and execute an application 611 and a detector 615. The detector 615 is an application or other program configured to detect vulnerabilities in the application 611. In particular, vulnerabilities detected according to various disclosed embodiments include unauthorized or unapproved exposure of one or more ports (not shown) to external resources.

The test external resource 650 is configured to attempt to connect to applications executed by the host device 610 to allow for identifying potential exposure vulnerabilities. To this end, the test external resource 650 may be, but is not limited to, a server of an exposure vulnerability testing service. The test external resource 650 is configured to send results of connection attempts to the detector 615.

In an embodiment, the console device 620 is configured to provide a host device database 625 including data related to the host device 610. To this end, the console device 620 may include a host device database 625 that interfaces with the detector 615 to provide any relevant host device data (e.g., host device specifications) to the detector 615.

In an embodiment, the detector 615 is configured to detect when the application 611 is at risk of unsecure (e.g., unauthorized or unapproved) exposure. The application may be at risk when, but not limited to, the application 611 is configured to handle sensitive information (e.g., financial data, production data, and the like), the application 611 is configured for external resource access (e.g., an application configured with ports for connecting to a network), the application 611 has weak transport layer security (TLS), and the like.

In an embodiment, the detector 615 is configured to perform static testing to determine whether the application 611 is configured correctly. Determining whether the application 611 is configured correctly may include, but is not limited to, analyzing a specification or other configuration of the host device 610, attempting to access the application, and the like. To this end, in some implementations, the detector 615 may be configured to attempt to access the application 611 via one or more ports. In another example implementation, analyzing the host device specification may include a password indicated in the host device specification to a list of unsecure passwords.

In an embodiment, when the application 611 is not configured correctly, the detector 615 is configured to perform dynamic testing at runtime of the at-risk application 611 in order to detect any exposure vulnerabilities of the application 611. To this end, the detector 615 is configured to determine through which ports of the host device 610 through which the application is accessible. The detector 615 is configured to send, to the test external resource 650, connection data for connecting to the determined access ports. As a non-limiting example, the connection data may include a port identifier of each determined port. As another non-limiting example, the connection data may include an Internet Protocol (IP) address. The test external resource 650 is configured to attempt to connect to each determined port based on the connection data and to send a results notification indicating results of the attempt to the detector 615. In some implementations, the results notification may further include an external IP address of the host device. To this end, the test external resource may be configured to identify the public IP address of the application 611.

In an embodiment, when the results notification indicates that the connection attempt was successful (i.e., that the test external resource 650 successfully connected to the determined port), an exposure vulnerability is detected and the detector 615 is configured to generate and send an alert to the console device 620. The alert may include, but is not limited to, a host device identifier, a port identifier, and the like.

In an embodiment, when the connection attempt by the test external resource 650 is successful, IP addresses of external resources that access the application 611 may be collected. The alert may further include the collected IP addresses. As mentioned above, the console device 620 may be configured to cause the display of the alert to a security information and event management (SIEM) device.

It should be noted that FIG. 6 is described with respect to a single application hosted by a host device merely for simplicity purposes and without limitation on the disclosed embodiments. Multiple applications, any of which may be hosted on different host devices, may be protected via detection of exposure vulnerabilities as described herein without departing from the scope of the disclosure.

The various embodiments have been discussed herein with a reference to software containers. A software container provides an executable environment with a complete filesystem. A software container may include a micro-service, a Docker container, a light virtual machine, and the like.

It should also be noted that the various embodiments are discussed with respect to host devices executing software containers, but at least some of the disclosed embodiments may be equally applicable to hosts that do not execute software containers without departing from the scope of the disclosure. Each host device may be any device that has established a connection to a network.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 4C in combination; and the like.

What is claimed is:

1. A method for protecting an application from unsecure network exposure, comprising:
   identifying an at-risk application, wherein identifying the at-risk application further comprises determining that the application is configured incorrectly based on at least one static configuration test;
   identifying, at runtime of the at-risk application, at least one port through which the at-risk application is accessible when the at-risk application is determined to be configured incorrectly, wherein the at-risk application is executed at a host device connected to at least one network, the host device having the at least one port;
   sending, to an external resource, connection data for connecting to the at-risk application via the at least one port, wherein the external resource is configured to attempt to connect to the at-risk application based on the connection data and to return results of the connection attempt;
   determining, based on the results of the connection attempt, whether an exposure vulnerability exists; and
   performing at least one mitigation action when an exposure vulnerability exists.

2. The method of claim 1, wherein identifying the at least one port further comprises:
   probing a plurality of ports of the host device, wherein the plurality of ports includes the at least one port through which the application is accessible.

3. The method of claim 1, further comprising:
   determining that an exposure vulnerability exists when the external resource successfully connects to the application.

4. The method of claim 1, wherein the host device includes at least one software container, wherein the application is executed via a first software container of the at least one software container, further comprising:
   identifying the first software container, wherein the identified at least one port includes at least one port accessible to the first software container.

5. The method of claim 4, further comprising:
   determining that the application is not configured correctly based on at least one static configuration test, wherein the at least one static configuration test includes analysis of a specification of the identified first software container.

6. The method of claim 1, wherein performing the at least one mitigation action further comprises:
   generating and sending an alert, wherein the alert indicates at least one of: an identifier of the host device, and an identifier of each of the at least one port.

7. The method of claim 1, further comprising:
   identifying the application when the application is at risk of an exposure vulnerability, wherein the application is exposed to the at least one network when the application is executed.

8. The method of claim 1, wherein the external resource is not included in the host device.

9. A non-transitory computer readable medium having stored thereon instructions for causing a processing circuitry to execute a process for protecting an application from unsecure network exposure, the process comprising:
   identifying an at-risk application, wherein identifying the at-risk application further comprises determining that the application is configured incorrectly based on at least one static configuration test;

identifying, at runtime of the at-risk application, at least one port through which the at-risk application is accessible when the at-risk application is determined to be configured incorrectly, wherein the at-risk application is executed at a host device connected to at least one network, the host device having the at least one port;

sending, to an external resource, connection data for connecting to the at-risk application via the at least one port, wherein the external resource is configured to attempt to connect to the at-risk application based on the connection data and to return results of the connection attempt;

determining, based on the results of the connection attempt, whether an exposure vulnerability exists; and performing at least one mitigation action when an exposure vulnerability exists.

10. A system for protecting an application from unsecure network exposure, comprising:
 a processing circuitry; and
 a memory, the memory containing instructions that, when executed by the processing circuitry, configure the system to:
 identify an at-risk application, wherein identifying the at-risk application further comprises determining that the application is configured incorrectly based on at least one static configuration test;
 identify, at runtime of the at-risk application, at least one port through which the at-risk application is accessible when the at-risk application is determined to be configured incorrectly, wherein the at-risk application is executed at a host device connected to at least one network, the host device having the at least one port;
 send, to an external resource, connection data for connecting to the at-risk application via the at least one port, wherein the external resource is configured to attempt to connect to the at-risk application based on the connection data and to return results of the connection attempt;
 determine, based on the results of the connection attempt, whether an exposure vulnerability exists; and
 perform at least one mitigation action when an exposure vulnerability exists.

11. The system of claim 10, wherein the system is further configured to:
 determine that the application is not configured correctly based on at least one static configuration test.

12. The system of claim 10, wherein the system is further configured to:
 probe a plurality of ports of the host device, wherein the plurality of ports includes the at least one port through which the application is accessible.

13. The system of claim 10, wherein the system is further configured to:
 determine that an exposure vulnerability exists when the external resource successfully connects to the application.

14. The system of claim 10, wherein the host device includes at least one software container, wherein the application is executed via a first software container of the at least one software container, wherein the system is further configured to:
 identify the first software container, wherein the identified at least one port includes at least one port accessible to the first software container.

15. The system of claim 14, wherein the system is further configured to:
 determine that the application is not configured correctly based on at least one static configuration test, wherein the at least one static configuration test includes analysis of a specification of the identified first software container.

16. The system of claim 10, wherein the system is further configured to:
 generate and send an alert, wherein the alert indicates at least one of: an identifier of the host device, and an identifier of each of the at least one port.

17. The system of claim 10, wherein the system is further configured to:
 identify the application when the application is at risk of an exposure vulnerability, wherein the application is exposed to the at least one network when the application is executed.

18. The system of claim 10, wherein the external resource is not included in the host device.

* * * * *